Figure 1:
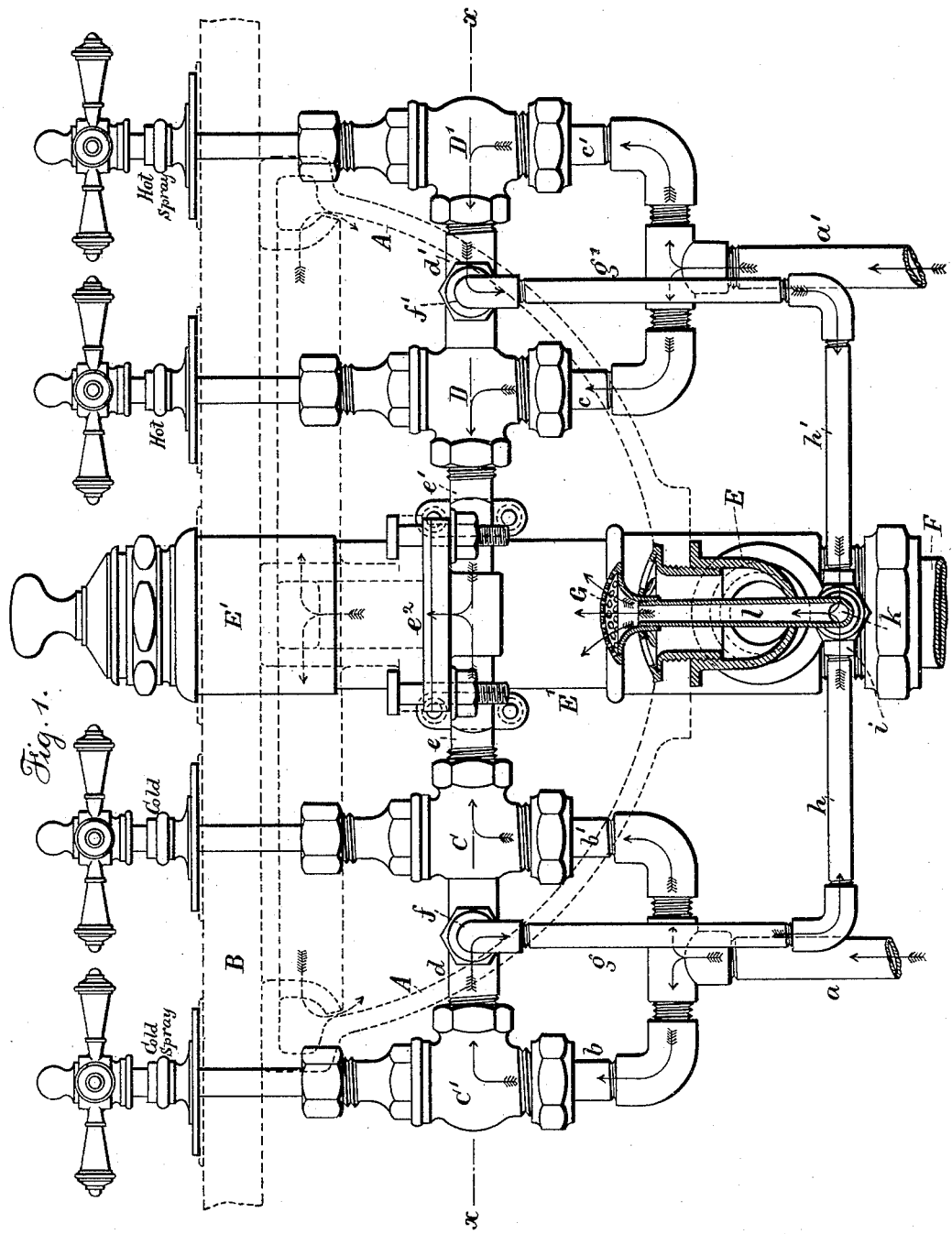

(No Model.) 2 Sheets—Sheet 1.

J. REID.
SUPPLY FITTINGS FOR BASINS.

No. 391,647. Patented Oct. 23, 1888.

Witnesses:
J. Stait
Chas. H. Smith

Inventor:
John Reid,
per Lemuel W. Serrell, Atty.

N. PETERS, Photo-Lithographer, Washington, D. C.

(No Model.) 2 Sheets—Sheet 2.
J. REID.
SUPPLY FITTINGS FOR BASINS.
No. 391,647. Patented Oct. 23, 1888.
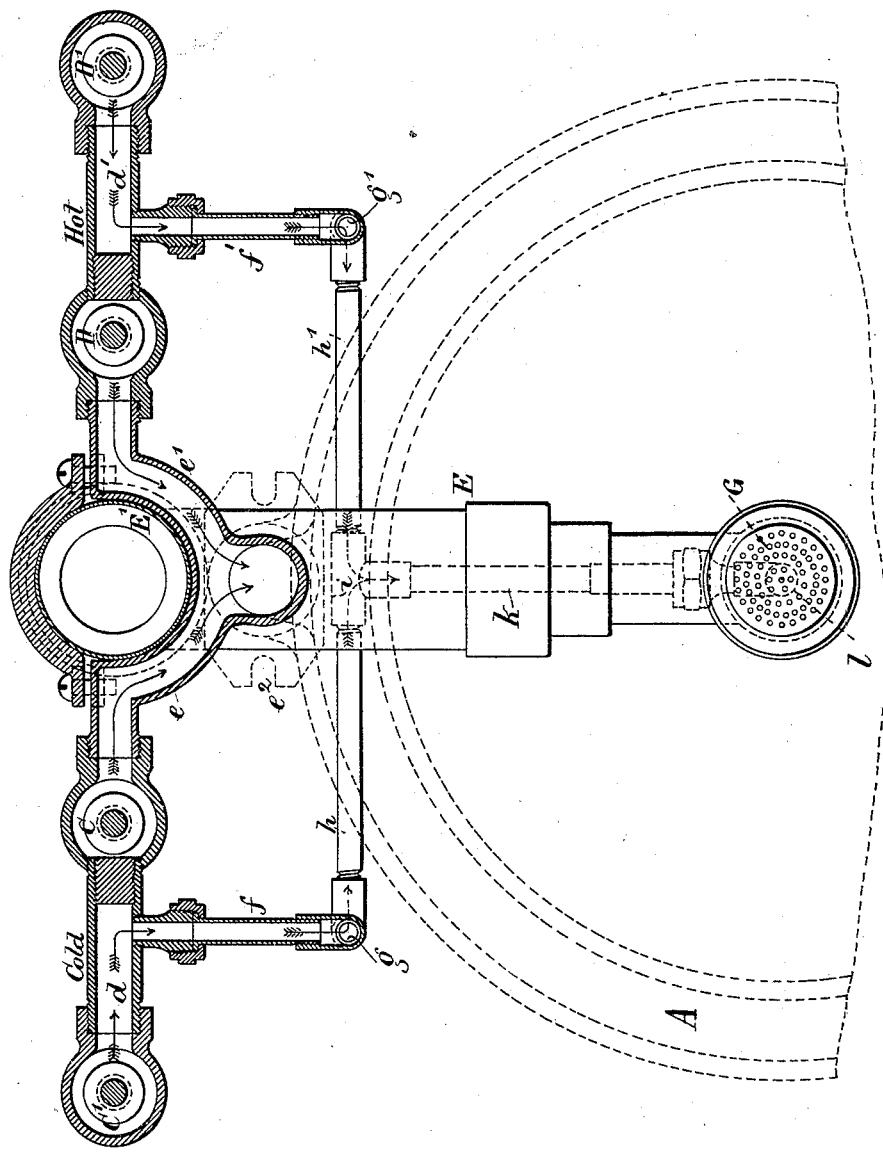
Witnesses:
J. Staib
Chas. H. Smith
Inventor:
John Reid,
per Lemuel W. Serrell
atty.

UNITED STATES PATENT OFFICE.

JOHN REID, OF YONKERS, NEW YORK, ASSIGNOR TO THE J. L. MOTT IRON WORKS, OF NEW YORK, N. Y.

SUPPLY FITTINGS FOR BASINS.

SPECIFICATION forming part of Letters Patent No. 391,647, dated October 23, 1888.

Application filed June 11, 1888. Serial No. 276,733. (No model.)

*To all whom it may concern:*

Be it known that I, JOHN REID, of Yonkers, in the county of Westchester and State of New York, have invented an Improvement in Supply Fittings for Basins, of which the following is a specification.

My invention relates, essentially, to that class of wash-basins known as "flushing-rim" basins, although the same is adapted for use with a basin that is not a flushing-rim; and my invention relates to the combination, with a basin and a standing waste and overflow of the peculiar arrangement of devices hereinafter set forth, of hot and cold water pipes and valves and connections therefrom to a spray or douche in the basin.

In carrying out my invention I employ a pair of valves and handles for cold water and a pair for hot water and pipes connected to said valves from sources of supply and pipes from one cold-water valve and one hot-water valve connected to the flushing-rim of the basin, whereby either hot or cold water, or a mixture thereof, can be introduced into the basin, and also pipes from the other cold and hot water valves to a spray or douche pipe which is located in the center of the waste-pipe and to a spray or douche which projects up into the basin-bowl, so that thereby I can convey hot or cold water, or a mixture of the same, up through the douche, where the same is formed into a spray and adapted to be projected vertically for use.

In the drawings, Figure 1 is an elevation of the pairs of hot and cold water valves and pipes and of the standing waste and overflow, the slab and basin being shown in dotted lines and the douche and waste-pipe in section; and Fig. 2 is a sectional plan at $x$ $x$ of Fig. 1.

A represents in dotted lines, Fig. 1, the porcelain flushing-rim basin, which may be oval or round, as desired.

B represents, also in dotted lines, the slab.

C C' are the valves, having vertical handles above them, which form the supply fittings for cold water, and D D' are the valves which form the supply fittings for hot water.

E represents the waste-pipe, and E' the combined waste and standing overflow, and F represents the sewer-pipe, and G the douche or spray projecting above the center of the waste at the center or lower portion of the basin.

$a$ $a'$ represent pipes for cold and hot water from sources of supply, and $b$ $b'$ branch pipes connected to the supply-pipe $a$ and passing, respectively, to the valves C C'.

$c$ $c'$ represent branch pipes connected to the supply-pipe $a'$ and passing to the valves D D'.

$d$ represents a short pipe connecting the valves C C', and $d'$ is a short pipe connecting the valves D D'; but each of these small pipes $d$ $d'$ is plugged at its end that connects with the valves C and D, as shown in the section Fig. 2, so that no water can pass from the pipes $d$ $d'$ in the valves C and D.

$e$ $e'$ represent a union pipe or mixing-chamber, the ends of which are connected to the valves C and D, and which is of circular form and passes around the standing waste-pipe, and is connected by a coupling at $e^2$ with the back of the flushing-rim basin A.

$f$ $f'$ represent branch pipes connected with the pipes $d$ $d'$, and the pipes $g$ $g'$ are connected to $f$ $f'$, and the horizontal pipes $h$ $h$ are connected at one end to $g$ $g'$ and at the other end to the T-union $i$, and the horizontal pipe $k$ is also connected to this T-union $i$ at one end and at the other end to the vertical pipe $l$, which passes through the waste-pipe E and through the strainer of the waste-pipe and connects with the spray of the douche G.

The operation of the parts is as follows, presuming that in the pipes $a$ and $b$ $b'$ there is cold water and in the pipes $a'$ and $c$ $c'$ there is hot water. If, now, it is desired to admit cold water to the flushing-rim basin, the valve C is opened by revolving its handle, and the water passes through said valve and through the pipe $e$ into the flushing-rim and into the basin. If it is desired to admit hot water to the basin, the valve D is opened by revolving its handle, and water passes through said valve and through the pipe $e'$ up into and through the flushing-rim into the basin, and it is obvious that by more or less opening each of these valves simultaneously a mixture of hot and cold, forming lukewarm water, can be admitted into the basin. If, now, it is desired to operate the douche G, the valves C and D being closed, the valve C' (marked "Cold Spray") is raised by revolving its handle, and cold water passes through the same into and through the pipes $d$, $f$, $g$, $h$, $k$, and $l$ and through the douche G as a spray into the basin, the arrows in the drawings in all cases indicating the direction taken by the water. If it is desired to admit hot water through the douche, the valve D' (marked "Hot Spray") is raised by revolving its handle, and the hot water passes through said valve and through the pipes $d'$, $f'$, $g'$, $h'$, $k$, and $l$, and so through the douche in a spray into the basin, and if it is desired to admit lukewarm water through such douche G it can be done by more or less opening the valves C' D' simultaneously, in which case the water flows through both valves and the before-named sets of pipes, the pipes $k$ $l$ becoming, as it were, a mixing-chamber for the hot and cold water before it is ejected through the douche-spray.

My improvement constitutes a very desirable apparatus, because therein in the same set of basin-fixtures I am enabled to admit into the basin either cold or hot water or both, the douche in the central lower portion of the basin being a very desirable feature for spraying or bathing the face or eyes.

I claim as my invention—

1. The combination, with a basin and waste and overflow pipes, of the cold-water-supply valves C C', the hot-water-supply valves D D', pipes connecting the valves C and D with the basin for admitting water thereto, the pipes $a$ $a'$ and pipes $b$ $b'$ and $c$ $c'$, connected, respectively, to the valves for hot and cold water for supplying hot and cold water, and the pipes $d$ $d'$, connected to the valves C C' and D D' and forming a water-passage with C' and D' only, the pipes $f$, $f'$, $g$, $g'$, $h$, $h'$, $k$, and $l$, connecting the valves C' and D' and the douche G, substantially as and for the purposes set forth.

2. The combination, with a basin and waste and overflow pipes, of the cold-water-supply valves C C', the hot-water-supply valves D D', pipes connecting the valves C and D with the basin for admitting water thereto, the pipes $a$ $a'$ and pipes $b$ $b'$ and $c$ $c'$, connected, respectively, to the valves for hot and cold water for supplying hot and cold water, the pipes $d$ $d'$, connected to the valves C C' and D D' and forming a water-passage with C' and D' only, and pipes connected, respectively, to the pipes $d$ $d'$ and douche G, whereby hot and cold water, or both, are supplied from the valves C' D' to the douche, substantially as set forth.

Signed by me this 22d day of May, 1888.

JOHN REID.

Witnesses:
EDWARD HAMMANN,
JOHN L. BRAID.